July 10, 1934.  J. J. KANE  1,966,248
METHOD OF WELDING AND SETTING PIPE IN WELLS
Filed Aug. 28, 1933

Inventor
JOSEPH J. KANE.
Jesse R. Stone
+
Lester B. Clark
By
Attorneys.

Patented July 10, 1934

1,966,248

UNITED STATES PATENT OFFICE 1,966,248

METHOD OF WELDING AND SETTING PIPE IN WELLS

Joseph J. Kane, Galveston, Tex.

Application August 28, 1933, Serial No. 687,154

1 Claim. (Cl. 285—111)

The invention relates to an improvement in the method of setting pipe and casing in wells and in the manner of coupling the pipe sections together so that the full strength of the pipe will be obtained.

In the drilling of oil and water wells it is usual to place strings of pipe in the well for two purposes, first, to case off the well and exclude extraneous matter, and the other purpose is to conduct the fluid from the well to the surface. It is the usual practice to connect the pipe or casing sections together by means of threaded couplings. It goes without saying that the full strength of the pipe can not be developed with the standard types of pipe couplings and this is particularly true with long strings of pipe which are being lowered into the well where the weight of all of the sections which have been lowered into the well are suspended by the last connected pipe section. Instances have occurred where the string of pipe has parted solely due to the weight of the pipe and it is not an uncommon practice to float the casing into the well in order to avoid excessive strains on the couplings which are, of course, the weakest portion of the string of pipe after it is made up.

Considerable difficulty and expense is also encountered in threading the larger diameter sections of pipe and in making the larger diameter threaded couplings to say nothing of the delay and trouble which is experienced on the derrick floor when these large diameter pipe sections are being connected together by means of the threaded coupling.

With the foregoing difficulties in view, the present invention has been conceived and embodies the idea of providing a coupling for the pipe sections which will be strong, safe and economical.

One of the objects of the invention is to provide a bell and spigot connection for the pipe sections so that the connection thereof may be welded as the pipe is lowered into position in the well to provide a fluid tight casing.

Another object of the invention is to provide a method of connecting the casing so that the full strength of the pipe will be available at the points of connection.

Another object of the invention is to provide an improved method and simplified procedure for running casing into the well and connecting the sections of casing together.

Another object is to provide an improved pipe joint connection for pipes which are being connected while disposed in a vertical position.

A still further object of the invention is to provide a casing connection which will occupy the minimum of diameter and present beveled faces so that there will be no abrupt obstruction presented to interfere with the flow of fluid around the casing.

Still another object of the invention is to provide a bell and spigot pipe connection wherein the bell has an inwardly undercut beveled face to form with the spigot end of the pipe a dam or pocket to receive the welding material in order that the pipe sections may be rigidly fixed together.

Other and further objects of the invention will be readily apparent when the following description is considered in connection with the accompanying drawing wherein Fig. 1 is a broken vertical sectional view of an arrangement of concentric strings of pipe which have been positioned and connected in accordance with the present invention.

Figures 1, 2, 3:
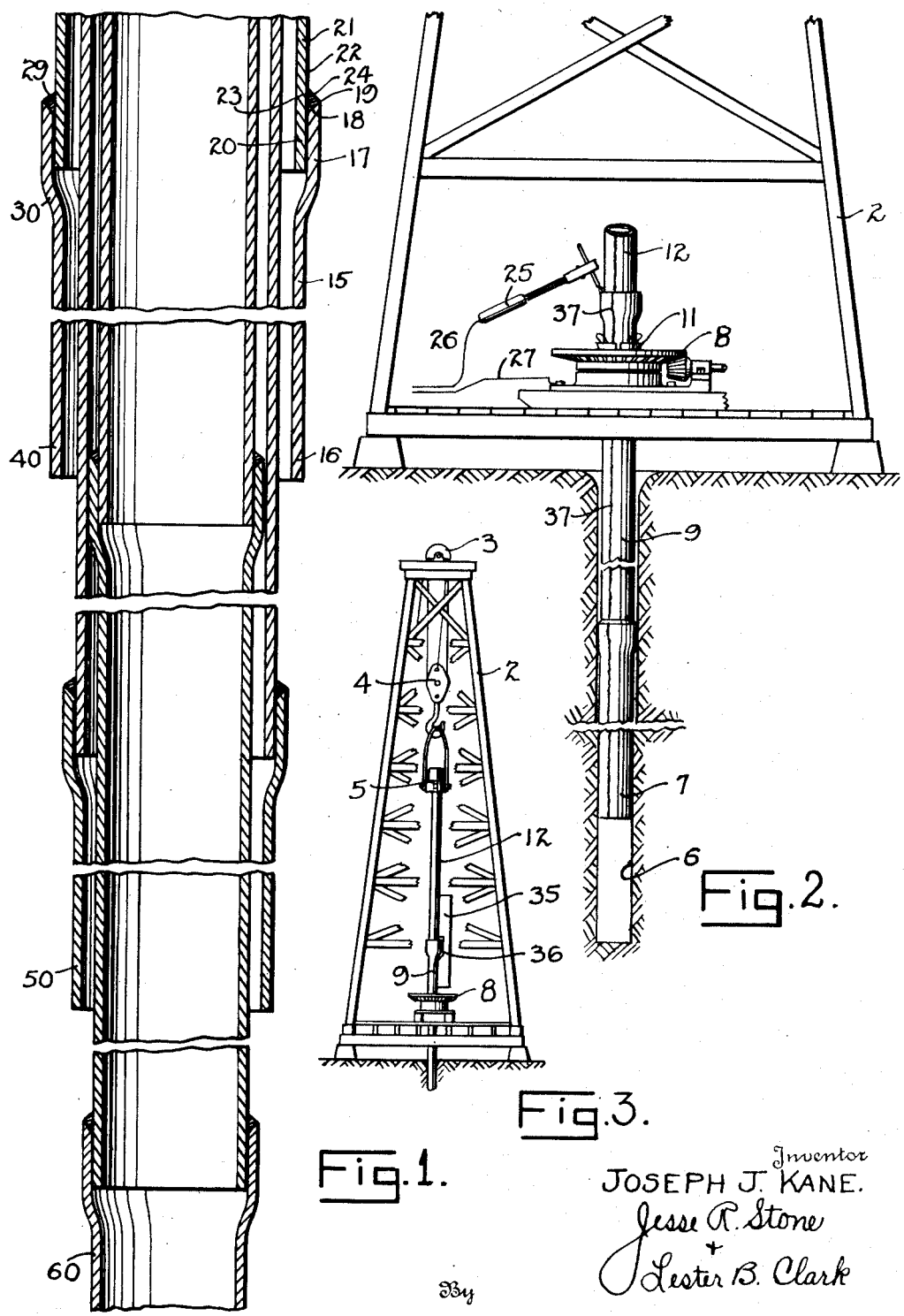
Fig. 2 shows in side elevation the derrick floor and the manner of connecting the pipe sections together as the casing string is being lowered into the well.
Fig. 3 is a diagrammatic view showing the well derrick and the manner of positioning the spigot end of the upper pipe section in the bell end of the next lower pipe and illustrating the manner of aligning the two pipe sections.

Fig. 3 shows the derrick at 2 which is used for suspending the equipment and apparatus in connection with the drilling of the well and shows the crown block 3, the traveling block 4 and the suspending elevator 5. In setting casing the well is drilled to the desired elevation and then the casing is assembled by lowering one section after another into the well and connecting them as they are being assembled at the surface. Fig. 2, for instance, illustrates the manner of inserting the pipe. The well bore is indicated at 6 and the lowermost section of pipe at 7. This pipe section 7 was first positioned in the rotary 8 or otherwise supported at the surface so that the pipe section 9 might be connected thereto.

The pipe section 9 is shown as being suspended in the rotary by means of the slips 11 so that the pipe section 12 may be connected thereto in assembling the string of pipe. Of course, if the casing head is placed upon the well it is probable that inner strings of pipe would be supported in the casing head instead of being supported in the rotary, as shown in Fig. 2. The manner of supporting the pipe, however, forms no part of the present invention. As the subsequent pieces of pipe are connected to the upper end of the string, the string is gradually lowered into the well until the lowermost pipe section 7 arrives at the desired elevation.

Fig. 1 shows an arrangement of concentric strings of pipe which have been assembled and positioned in accordance with the invention. A pipe section 15 is typical of those used and is made with a straight or spigot end 16 and an enlarged or bell end 17. This pipe section will be position as shown in Fig. 1 with the spigot end down and the bell end up. The bell end, however, is specially formed with an undercut beveled face 18. This beveled face tapers upwardly where it merges at 19 with the outer periphery of the pipe. When the spigot end 20 of the next pipe section 21 is positioned inside of the bell 17, then the outer surface 22 thereof fits closely within the bell and these two surfaces form a pocket or dam 23 to receive the body of the welding material 24. This welding material may be positioned in any desired manner but the electric method of welding is preferable because of the speed with which the welding operation may be completed. Fig. 2 shows a welding torch 25 which has an electrical connection 26 and the ground connection 27. With this arrangement the welding material 24 can be quickly positioned and, if desired, more than one torch may be used so that the weld may be made in a very short time interval.

The welding material 24 will be so positioned that when finished it will present an inclined shoulder 29 so that there will be no abrupt obstruction on the surface of the casing. The belt 17, of course, merges with the pipe by means of the inclined shoulder 30.

It should be noted that the width of the ring of welding material 24 is at least equal to the thickness of the pipe which is being welded. This makes a connection of at least a strength equal to the strength of the pipe which is being connected, so that full strength of the pipe may be imparted to the connection and be available for suspending the string of pipe in the well. This is of particular importance in connection with the present invention because the full strength of the pipe could not be developed heretofore with the connections which were available so that a much stronger string of casing is provided when the casing is assembled in accordance with this invention.

In assembling the pipe sections to form the string of casing, the arrangement shown in Fig. 3 may be practiced wherein the pipe section 9 is shown as supported on the derrick floor by means of the rotary 8 and the pipe section 12 is shown as supported in the elevator 5. In bringing the bell and spigot ends of the pipe together, it is desirable to have the pipe properly aligned and, to this end, the straight edge 35 has been provided. This straight edge has a cut out portion 36 to bridge the bell of the pipe section 9 and in this manner can be applied against the surface of both pipe sections to insure that they are in proper alignment. When they have been so aligned, then the welding operation may be performed and the pipe section 12 lowered to the elevation previously occupied by the pipe section 9 and an additional section attached. This operation may be repeated until the desired length of the casing has been inserted in the well.

Fig. 1 shows an arrangement of concentric string of casing wherein 40 represents the string of surface casing, 50 represents the next string of casing inside of the surface casing, and 60 represents the inner string of pipe which may be in the form of tubing or may be a string of casing through which the fluid is to be removed from the well or it may be the inner string of pipe which supports the well screen or liner. In any event, where a plurality of strings of pipe are to be arranged in the well the present invention is to advantage because the pipe joints occupy a minimum of diameter and permit the strings to be more closely interfitted than with the standard type of pipe coupling. The beveled faces 29 and 30 cause the pipes to slide evenly one inside of the other so that they may be more closely fitted. It is to be understood that the surface casing 40 would probably be first positioned and then the strings 50 and 60 subsequently inserted in the well.

A particular feature of advantage in connection with the present invention is that the pipe may be made up in any desired diameter. It is contemplated that any desired type of pipe may be belled to be used in practicing the invention, but it has been found that welded pipe made from sheet material is most satisfactory and can be most economically produced. Fig. 2 shows the longitudinal weld of such pipe sections at 37. The standard types of casing now used are made to certain uniform diameters. The well operator must purchase these standard diameters and use them irrespective of peculiar and particular conditions which may be encountered in his individual well.

It is contemplated with the present invention, however, to make up the pipe in the desired diameter so that the pipe will be closely interfitting as shown in Fig. 1 in order that the largest diameter pipe possible may be carried to the bottom of the well. In view of the fact that the pipe may be made up of sheet steel, the desired strength can be obtained by using a thinner gauge material than would be possible with the ordinary forms of seamless pipe.

The invention contemplates broadly the provision of welded pipe sections which are to be welded end to end in order to form a string of pipe which is assembled as it is lowered into the well.

The actual welding of the sections together may be speedily performed after the pipe sections are positioned as seen in the drawing. The dam or pocket is formed by the undercut bevel of the bell portion and the periphery of the spigot of the next above section. One or more welders may work on the pipe, it having been found that two welders starting on opposite sides of the pipe can quickly complete the weld.

What is claimed is:

In the art of setting well casing consisting of bell and spigot end pipes, the steps of undercutting the bell end, positioning a pipe section in the well bore with the bell end uppermost, inserting the spigot end of another pipe section in the bell, and filling the undercut end with welding material to form a bond with the spigot end so that a rigid connection of a strength at least equal to the strength of the pipe is obtained.

JOSEPH J. KANE.